(12) United States Patent
Jakatdar et al.

(10) Patent No.: US 7,580,823 B2
(45) Date of Patent: Aug. 25, 2009

(54) GENERATION AND USE OF INTEGRATED CIRCUIT PROFILE-BASED SIMULATION INFORMATION

(75) Inventors: Nickhil Jakatdar, Los Altos, CA (US); Xinhui Niu, San Jose, CA (US); Junwei Bao, Palo Alto, CA (US)

(73) Assignee: Tokyo Electron Limited, Tokyo (JP)

( * ) Notice: Subject to any disclaimer, the term of this patent is extended or adjusted under 35 U.S.C. 154(b) by 350 days.

(21) Appl. No.: 11/595,358

(22) Filed: Nov. 9, 2006

(65) Prior Publication Data

US 2007/0118349 A1    May 24, 2007

Related U.S. Application Data

(63) Continuation of application No. 10/087,069, filed on Feb. 28, 2002, now Pat. No. 7,136,796.

(51) Int. Cl.
    *G06G 7/62* (2006.01)
(52) U.S. Cl. .................. 703/13; 703/14; 716/4
(58) Field of Classification Search .......... 703/13–17; 716/4
    See application file for complete search history.

(56) References Cited

U.S. PATENT DOCUMENTS

| | | | |
|---|---|---|---|
| 5,539,652 A | 7/1996 | Tegethoff | |
| 5,719,796 A | 2/1998 | Chen | |
| 5,754,826 A | 5/1998 | Gamal et al. | |
| 5,923,567 A | 7/1999 | Simunic et al. | |
| 6,197,605 B1 | 3/2001 | Simunic et al. | |
| 6,317,211 B1 | 11/2001 | Ausschnitt et al. | |
| 6,433,878 B1 | 8/2002 | Niu et al. | |
| 6,609,086 B1 | 8/2003 | Bao et al. | |
| 6,694,275 B1 | 2/2004 | Jakadar et al. | |
| 6,757,645 B2 | 6/2004 | Chang et al. | |
| 6,768,983 B1 | 7/2004 | Jakatdar et al. | |
| 6,968,303 B1 | 11/2005 | Wang et al. | |
| 7,136,796 B2 * | 11/2006 | Jakatdar et al. | ............... 703/13 |
| 2001/0051856 A1 | 12/2001 | Niu et al. | |

OTHER PUBLICATIONS

Niu, "An Integrated System of Optical Metrology for Deep Sub-Micron Lithography", PhD dissertation, UC Berkeley, 1999, pp. 1-139.*

Press, W.H., Flannery, B.P, Teukolsky, S.A., Vetterling, W.T. (1986). *Numerical Recipes in Fortran: The Art of Scientific Computing*. Second Ed., Cambridge University Press, pp. 436-488.

* cited by examiner

*Primary Examiner*—Kamini S Shah
*Assistant Examiner*—Herng-Der Day

(57) ABSTRACT

The invention includes a method and a system for generating integrated circuit (IC) simulation information regarding the effect of design and fabrication process decisions. One embodiment includes creating and using a data store of profile-based information comprising metrology signal, structure profile data, process control parameters, and IC simulation attributes. Another embodiment includes creation and use of a simulation data store generated using test gratings that model the geometries of the IC interconnects. The interconnect simulation data store may be used in-line for monitoring electrical and thermal properties of an IC device during fabrication. Other embodiments include methods and systems for generating and using simulation data stores utilizing a metrology simulator and various combinations of a fabrication process simulator, a device simulator, and/or circuit simulator. Information from the simulation data store may be used in-line in-situ during the design or fabrication process steps.

20 Claims, 14 Drawing Sheets

Simulation Data Store Format 800

| 801 Signal | 803 Profile Data | 804 Simulation Data Segment |||
|---|---|---|---|---|
| | | 805 Simulation Type | 807 Process Control Parameters or Input Parameters | 809 Fabrication, Device and/or Circuit Attributes | where the Simulation Data Segment comprising Simulation Type, and Process Control Parameters or Input Parameters, and Fabrication, Device, and/or Circuit Attributes occurs n number of times and where Simulation Type may be:

Fabrication Process Simulation:
    Lithography Simulation
    Implantation Simulation    Diffusion Simulation
    Oxidation Simulation    Deposition and Etching Simulation
    CMP Simulation    Deposition and Reflow Simulation
    2- Dimensional Process Simulation    3- Dimensional Fabrication Simulation.
    Other Fabrication Process Simulation.

Device Simulation
    Interconnect Simulation    Power Device Simulation
    Electrostatic Discharge Simulation    Compound Device Simulation
    Optical Device Simulation    Other Device Simulation Circuit Simulation
    Transient Simulation    Noise Simulation
    Signal Integrity Simulation    Other Circuit Simulation Combined Fabrication Process & Device Simulation
Combined Device & Circuit Simulation
Combined Fabrication Process, Device & Circuit Simulation

FIGURE 10

Example 1: Interconnect Device Simulation
801 -Signal: Values representing Tan (Ψ) and Cos (Δ) for a periodic structure diffracted spectra
803 - Profile Data:
    Top Critical Dimension (CD), nanometers (nm)
    Bottom CD, nm
    Height, nm
    Trapezoidal Profile with Footing
804 - Simulation Data Segment
    805 - Simulation Type: Interconnect Device Simulation
    807 - Input Parameters:
        Profile Data
        Other Device Simulation Input Parameters
    809 - Device Attributes
        Capacitance, farads
        Inductance, henrys
        Resistance, ohms
        Other Electrical & Thermal Device Attributes

Example 2: Fabrication Process & Device Simulation
801 -Signal: Values representing Tan (Ψ) and Cos (Δ) for a periodic structure diffracted spectra
803 - Profile Data:
    Top critical dimension (CD), nanometers (nm)
    Bottom CD, nm
    Height, nm
    Trapezoidal profile with footing
804 - Simulation Data Segment 1
    805 - Simulation Type: Lithography & Etch Simulation
    807 - Input Parameters:

| | |
|---|---|
| Numerical aperture | Focus |
| Post Exposure Bake Temperature | Exposure |
| Anti-Reflective Coating Thickness | Resist Thickness |
| Exposure Time | Other Fabrication Process Control Parameters |

809 - Fabrication Process Attributes
        Profile Data
        Other Fabrication Process Attributes
804 - Simulation Data Segment 2
    805 - Simulation Type: Interconnect Device Simulation
    807 - Input Parameters:
        Profile Data
        Other Device Simulation Input Parameters
    809 - Device Attributes
        Capacitance, farads
        Inductance, henrys
        Resistance, ohms
        Other Electrical & Thermal Device Attributes

FIGURE 10 Continued

GENERATION AND USE OF INTEGRATED CIRCUIT PROFILE-BASED SIMULATION INFORMATION

CROSS REFERENCE TO RELATED APPLICATIONS

This application is a continuation of U.S. patent application Ser. No. 10/087,069, filed on Feb. 28, 2002, entitled Generation and Use of Integrated Circuit Profile-Based Simulation Information, owned by the assignee of this application and incorporated herein by reference.

BACKGROUND OF INVENTION

1. Field of Invention

The present application relates to the general area of integrated circuit (IC) manufacture and more particularly to methods and systems for creating and using a data store of profile-based simulations information.

2. Related Art

With the demand for increasing clock rates and decreasing geometries of IC structures, there is a need for rapid feedback on the effect of wafer design and fabrication process decisions. In many traditional IC manufacturing environments, the effect of a design decision or a fabrication process change is frequently not immediately known by the designers or the process engineers until much later, resulting in costly rework or unusable end products. IC design objectives drive the design activity where masks and IC fabrication plans are produced and transmitted to IC fabrication. IC fabrication produces the wafers that are tested and that undergo finishing operations in IC testing and finishing where flaws or shortcomings of the wafer are noted. Typically, some of the impact of design or process decisions is fed back to the design and fabrication groups at this point. After shipment of the products to the customers, additional product feedback that relate to design and process alterations eventually get back to IC design. It is well known in the industry that detection of a bad chip at the wafer level is much cheaper than detecting the bad chip after many end-products have been shipped to the customers. Thus, there is a need to provide information about the impact of design and process changes as early as possible.

In a similar manner, there is a dearth of immediate feedback on design and process decisions to the manufacturing process control group. FIG. 1 is a prior art architectural diagram illustrating the flow of data from IC manufacturing process control to the various fabrication areas and feedback from the fabrication areas to IC manufacturing process control. The IC manufacturing objectives 21 directs the IC manufacturing process control 23 group with manufacturing plans 24 related to thin film processes, deposition, or chemical mechanical polishing (CMP) 25, lithography 27, etching 29, photoresist (PR) stripping 33 and 35, implantation 31, and thermal processes 37 and IC testing and packaging 39. Process feedback 34 and design and overall fabrication feedback 32 are sent to the IC manufacturing process control 23 group. However, if a design did not produce the desired results or a process change caused some key critical dimension (CD) of the structures to be out of the acceptable ranges, the batch of wafers affected may have to be discarded. Thus, there is a need to provide information in-line to the IC manufacturing process control group in order to minimize rejected wafers and to detect and correct process control parameters from drift or process control parameter variations. Even with the use of current design and fabrication process simulators, there is typically insufficient information available early and/or in-line with the fabrication process.

There are several fabrication process, device, and circuit simulators currently in use. Examples include software capable of interconnect simulation, lithography simulation, implantation simulation, diffusion simulation, oxidation simulation, deposition and etching simulation, CMP simulation, deposition and reflow simulation, 2-dimensional process simulation, and 3-dimensional fabrication process simulation, and others capable of simulating a step or series of steps of the IC fabrication process. Some simulators assume simple geometric shapes of IC structures. However, data provided by AFM, Cross-Section SEM (X-SEM), and optical metrology systems indicate the cross-sections of structures are complex shapes. These complex-shaped structures provide different electrical, thermal, and performance properties than the typical geometric shapes assumed. Other simulators attempt to model complex shapes with limited success due to the number of variables during fabrication. For example, the structure shape is greatly influenced by the process control parameters such as lithography numerical aperture, wavelength, focus exposure, post exposure bake (PEB) temperature, resist thickness, anti-reflective coating thickness, dielectric materials, and fabrication processes used.

As technology heads into the deep submicron geometries, (0.250 micron or less), there is a greater need for fast and accurate information relating to fabrication process attributes such as structure profiles, device attributes such as capacitance, inductance, and resistance and ultimately circuit attributes. Similarly, there is a need for fast and reliable information for process control parameters such as PEB temperature, focus, and exposure that generate the desired IC structure profiles that in turn provide the desired device and circuit attributes. Thus, there is a need for a method and/or system for making the information on profile data, signals, process control parameters, and process attributes available during the fabrication process. Alternatively, given a structure profile or process attribute target, there is a need for rapid information on the process control parameter values that would provide the desired results. For example, it is advantageous to know the combination of PEB temperature, time, numerical aperture, and focus required to fabricate a structure with the desired profile that delivers the required electrical, thermal, and performance properties.

SUMMARY OF INVENTION

The invention includes a method and a system for creating and using a data store of profile-based simulation information. One embodiment includes creating and using a data store of profile-based information comprising signals measured by a metrology device, structure profile data, process control parameters, and fabrication attributes. Information from the data store may be used in-line during the design or fabrication process and/or in-situ with the fabrication process equipments.

Another embodiment is a method of generating an interconnect simulation data store using test gratings that model the geometries of interconnects for the IC. The interconnect simulation data store may be used in-line for monitoring electrical and thermal properties of an IC during fabrication. Alternatively, the simulation data store server provides information about the process control parameters that would satisfy the required electrical properties of interconnects in the IC design for a given fabrication process.

Still another embodiment includes a method and system for generating simulation data store utilizing a metrology simulator and a fabrication process simulator. The fabrication process simulator may simulate lithography, implantation, diffusion, oxidation, deposition-and-etching, CMP, deposition-and-reflow, 2-dimensional process, 3-dimensional process simulator or combination of these processes. Based on a range of process control parameters and deviations of these process control parameters, structure profile data are generated using a fabrication process simulator. The simulated structure profile data are converted into signals using the metrology simulator. A simulation data store generator creates data store instances storing variations of the process control parameters and associated signals, profile data, and fabrication attributes. Other embodiments include methods and systems for generating simulation data store utilizing a metrology simulator and a combined process and device simulator or a combined process, device, and circuit simulator. Information from the simulation data store may be used in-line in-situ with each fabrication process step, providing up-to-date pertinent information to improve design, fabrication steps, yield, or information to correct process drifts.

BRIEF DESCRIPTION OF DRAWINGS

FIG. 10 illustrates a data store format of profile-based simulation data store in one embodiment of the present invention.

DETAILED DESCRIPTION OF EXEMPLARY EMBODIMENT(S)

Figure 1:
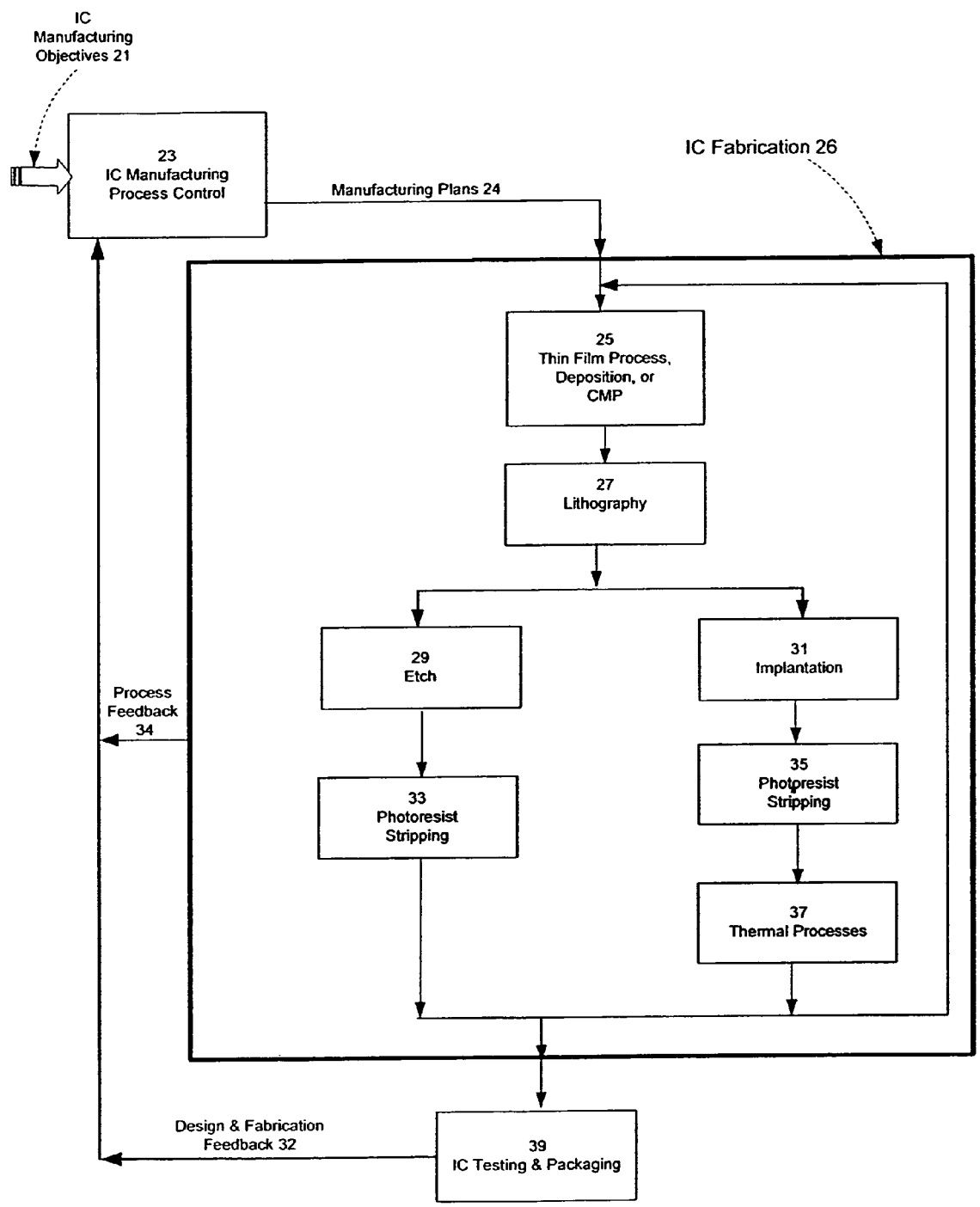
FIG. 1 is a prior art architectural diagram illustrating the flow of data from IC manufacturing process control to the various fabrication areas and feedback from the fabrication areas to IC manufacturing process control.
Figure 2:
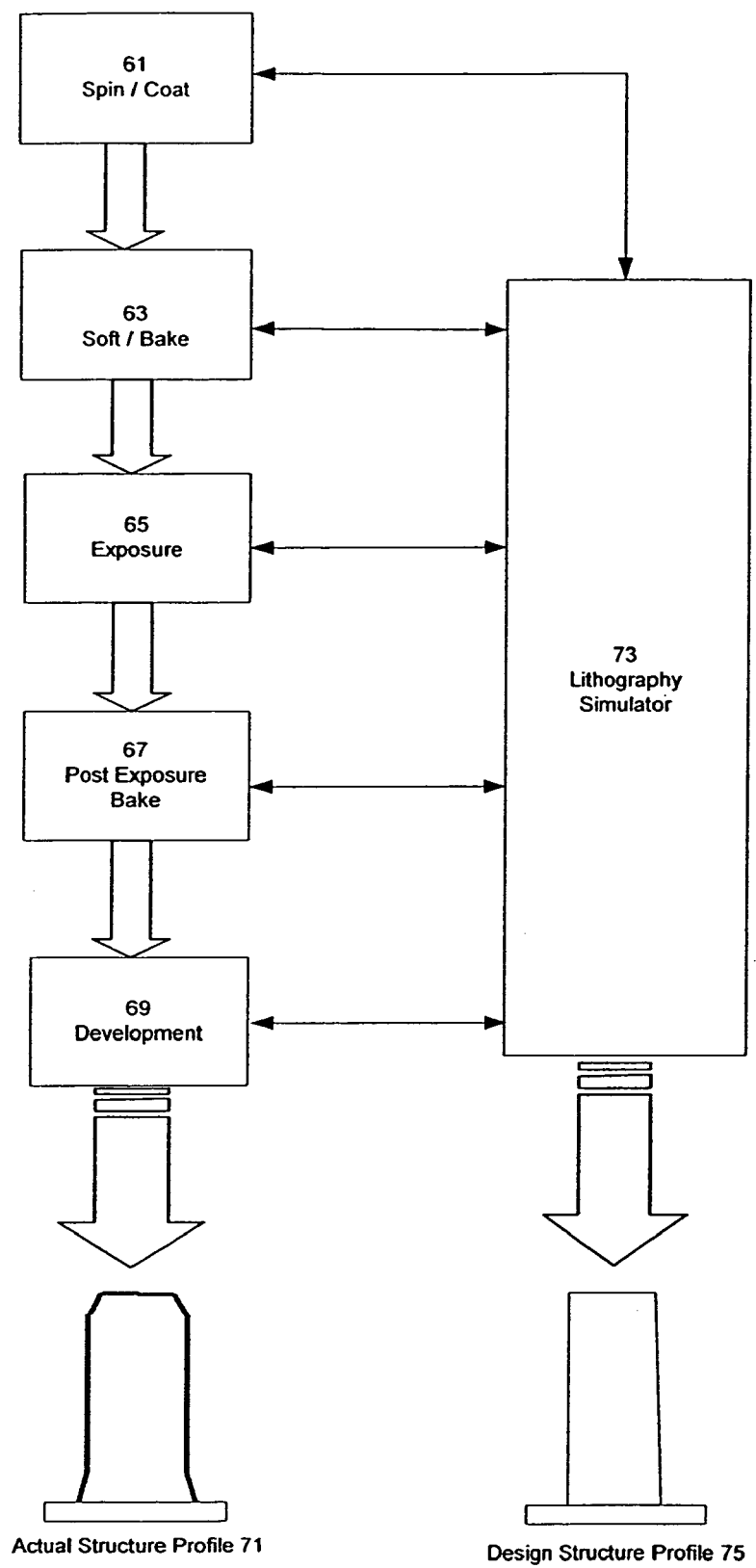
FIG. 2 is a prior art architectural diagram contrasting the layer feature profile of actual lithography process steps versus the feature profile typically generated in a lithography simulator.
Figure 3:
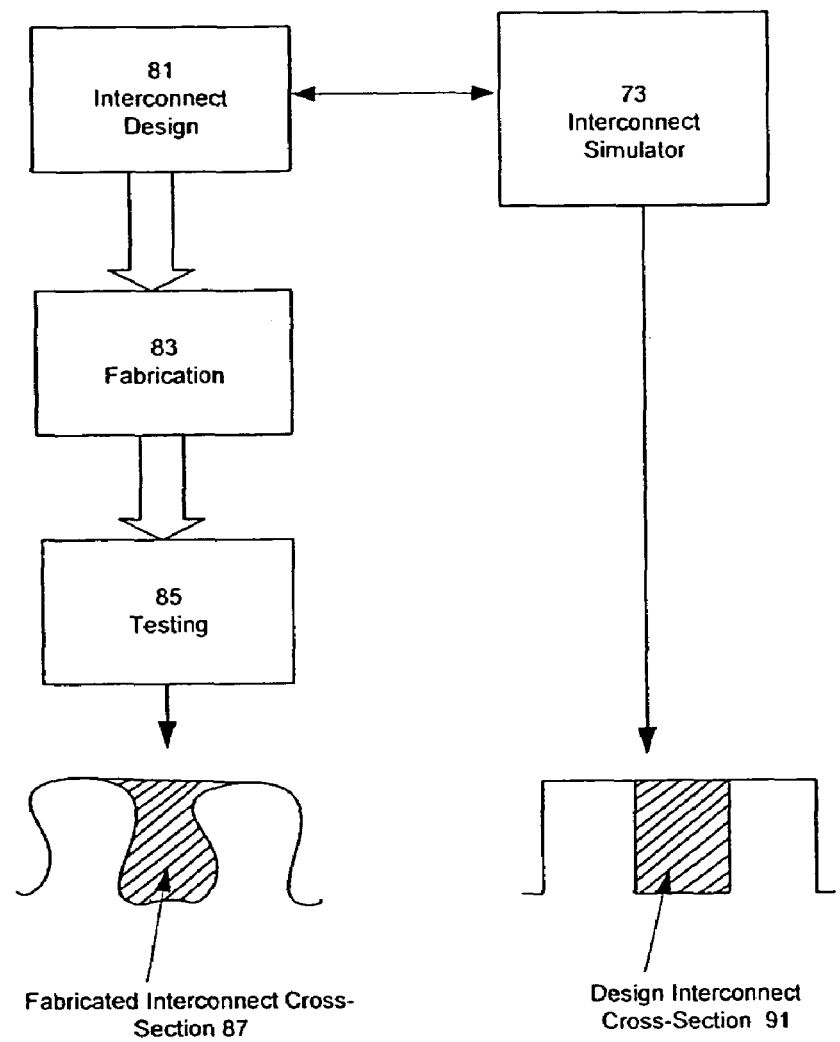
FIG. 3 is a prior art architectural diagram contrasting the interconnect cross-section of actual lithography and etching process steps versus the typical interconnect cross-section generated in an interconnect simulator.
Figure 11A:
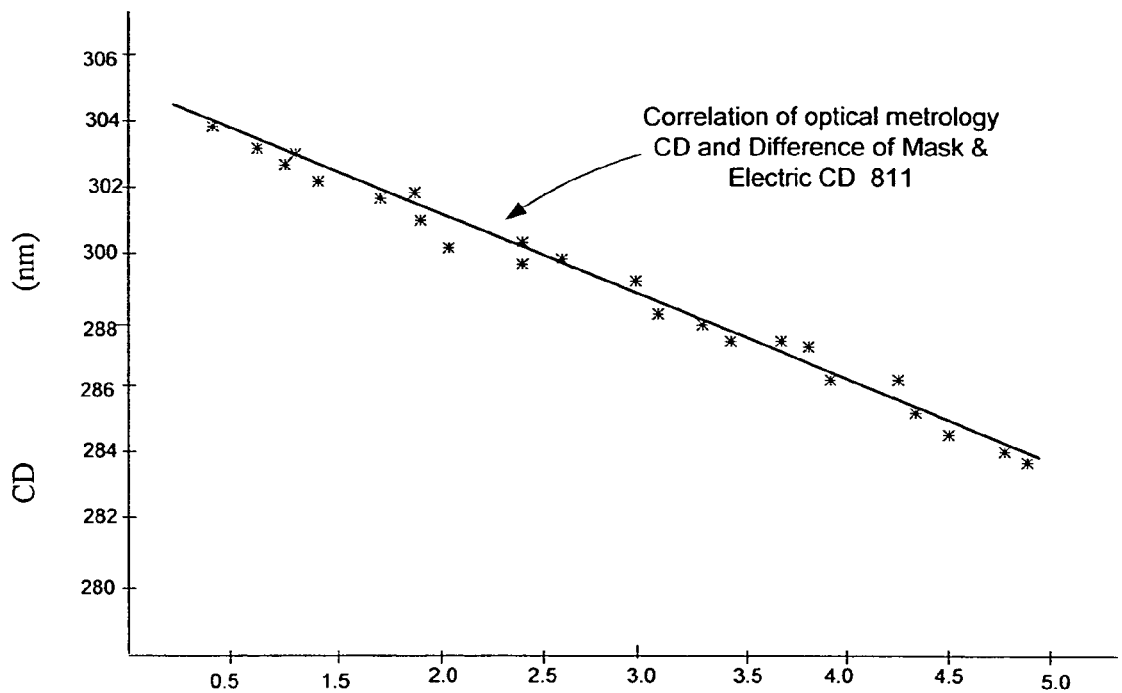
FIG. 11A is a graph showing the correlation of optical metrology CD and the difference $\Delta W$ of the electric CD from the mask CD.
Figure 11B:
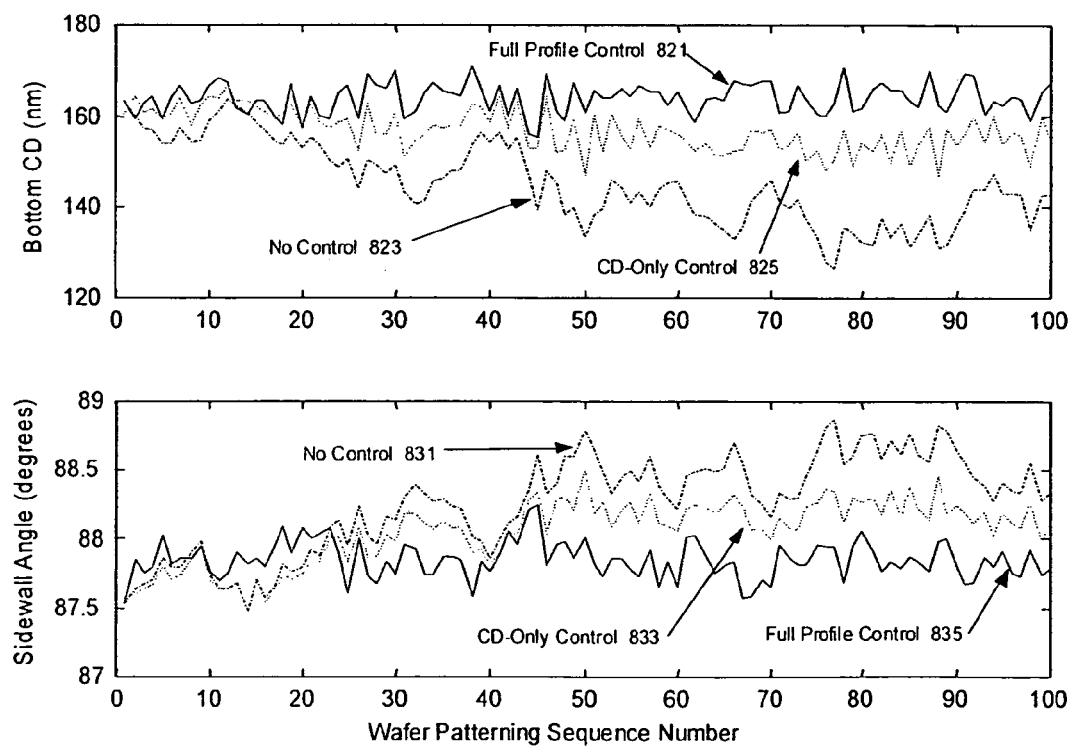
FIG. 11B are two graphs showing less variation of bottom CD and feature sidewall angle for a full-profile monitored fabrication process compared to CD monitored or no monitoring of profile.

The invention includes a method and a system for creating and using a data store of profile-based simulation information. FIGS. 2 and 3 illustrate the differences between simulation profiles versus actual profiles of structures. FIGS. 4 to 8B depict embodiments of the creation process for the profile-based simulation data store. FIGS. 9A and 9B depict embodiments for using the profile-based simulation information. FIG. 10 illustrates one format of the simulation data store, while FIGS. 11A and 11B represents empirical data that illustrate the utility of the concepts and principles of the present invention.

FIG. 2 is a prior art architectural diagram contrasting the layer feature profile of actual lithography process steps versus the feature profile generated in a typical lithography simulator. A lithography simulator 73 simulates the actual physical processes including spin/coat 61, soft bake 63, exposure 65, post exposure bake 67, and development 69 processes. The actual structure profile 71 may have a more complex profile such as a rounded top and a footing at the bottom of the feature, not the ideal rectangular shaped design structure profile 75 typically indicated by the lithographic simulator 73. The electrical properties of a circuit with non-rectangular structures, such as trapezoids, T-tops, and T-tops with undercut, rounded tops, with or without footing, are different from the electrical properties of simple geometric-shaped structures typically assumed in some fabrication process simulators.

Similarly, FIG. 3 is a prior art architectural diagram contrasting the interconnect cross-section of actual lithography, etching, and metallization process steps versus the interconnect cross-section generated in a typical interconnect simulator. The fabricated interconnect cross-section 87 produced after the steps of interconnect design 81, fabrication 83, and testing 85 is typically irregular in shape. The shape of the fabricated interconnect is affected by the geometries of the conductive material and the related dielectric material. Electrical and thermal characteristics of the interconnect structure with the fabricated interconnect cross-section 87 are different from the electrical and thermal characteristics of a rectangular design interconnect cross-section 91 typically assumed by interconnect simulators 73. Given the current drive towards deep submicron process technologies and increasing clock rates, interconnects essentially control the overall operating performance of high-speed systems. The geometries of interconnects have significant impacts on the electrical performance of the IC. Although atomic force microscopes (AFM) can provide interconnect profile information, AFM's are slow and cannot provide information on unpatterned layers. Critical dimension scanning electron microscopes (CD-SEM) can provide critical dimensions but cannot provide profile information or data about unpatterned layers.

In order to facilitate the description of the present invention, an optical metrology system is used to illustrate the concepts and principles. It is understood that the same concepts and principles equally apply to the other IC metrology systems as will be discussed below. The metrology system may be an optical, electric, electron, or mechanical metrology system. Examples of optical metrology systems include scatterometric devices such as spectroscopic ellipsometers, reflectometers, and the like. Examples of electron metrology systems include CD-scanning electron microscope (CD-SEM), transmission electron microscope (TEM), and focused ion beam (FIB) devices. An example of a mechanical metrology system includes an atomic force microscope (AFM) whereas an example of an electric metrology system includes a capacitance-measuring unit. As used in this application, a metrology signal may be an optical signal, an ion beam, an electron beam, or other like signals.

Figure 4:
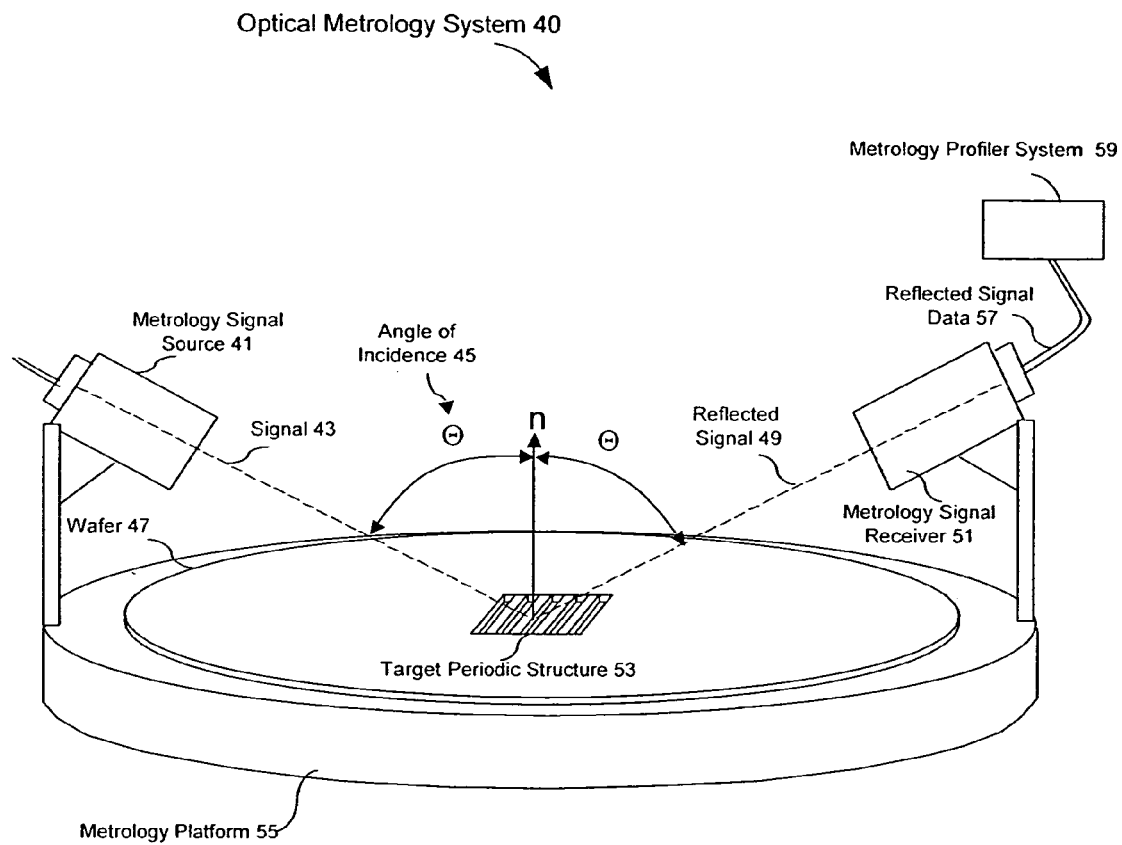
FIG. 4 is an architectural diagram illustrating the use of an optical metrology system to determine the profile of periodic structures.

FIG. 4 is an architectural diagram illustrating the use of an optical metrology system to determine the profile of periodic structures. The optical metrology system 40 includes a metrology signal source 41 projecting a signal 43 at the target periodic structure 53 of a wafer 47 mounted on a metrology platform 55. The metrology signal 43 is projected at an incidence angle θ towards the target periodic structure 53. The reflected signal 49 is measured by a metrology signal receiver 51. The reflected signal data 57 is transmitted to a metrology profiler system 59. The metrology profiler system 59 compares the measured reflected signal data 57 against a library of calculated reflected signal data representing varying combinations of critical dimensions of the target periodic structure and resolution. The library instance best matching the measured reflected signal data 57 is selected. The profile and associated critical dimensions of the selected library instance correspond to the cross-sectional profile and critical dimensions of the features of the target periodic structure 53. A similar optical metrology system 40 is described in co-pending U.S. patent application Ser. No. 09/727,530 entitled "System and Method for Real-Time Library Generation of Grating Profiles" by Jakatdar, et al., filed on Nov. 28, 2000, which issued as U.S. Pat. No. 6,768,983 on Jan. 27, 2004, owned by the assignee of this application and incorporated herein by reference.

Figure 5A:
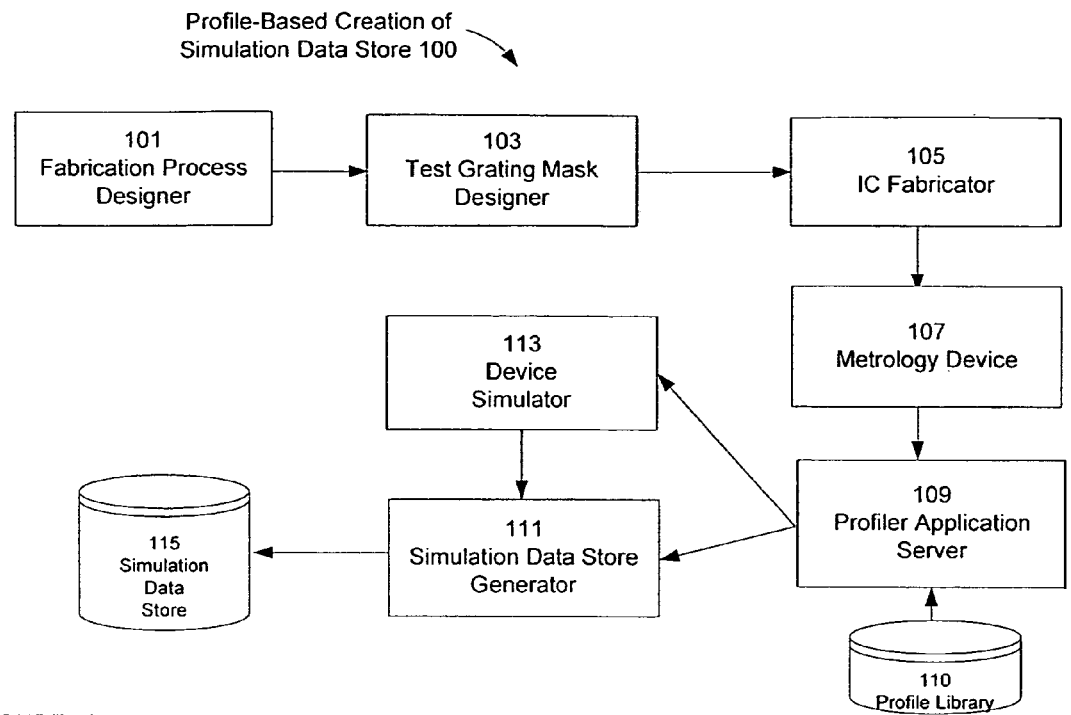
FIG. 5A is an architectural diagram illustrating the creation of a simulation data store using a device simulator in one embodiment of the present invention.

FIG. 5A is an architectural diagram illustrating the creation of a simulation data store using a device simulator in one embodiment of the present invention. The profile-based creation of a simulation data store 100 includes a fabrication process designer 101 where the series of IC fabrication steps are laid out. A set of test grating masks is designed in the test grating mask designer 103 to capture key features or characteristics of the area of interest. For example, if the area of interest is capacitance of interconnects, then the set of test grating masks designed captures the various interconnect geometric information. Interconnect geometric information include profiles of structures in the wafer. The IC fabricator 105 uses the set of test grating masks to make test structures that are measured by a metrology device 107. The metrology device 107, which may be an optical metrology device or a non-optical metrology device, measures the signals off the test gratings and transmits the measured signals to the profiler application server 109. The profiler application server 109 compares the measured signals off the test structures to the calculated signals in a profile library 110 covering a range of expected structures profile critical dimensions and resolutions. The profiler application server 109 selects the best matching profile library instance from the calculated signals of the profile library 110. In one embodiment, the best matching measured diffracted metrology signal is one with the least error compared to the diffracted metrology signal. Several optimization procedures are available to minimize the error, such as simulated annealing, described in "Numerical Recipes," section 10.9, Press, Flannery, Teulkolsky & Vetterling, Cambridge University Press, 1986; which is incorporated by reference. One error metric that produces appropriate results is the sum-of-the-squared-difference error, where the optimization procedure minimizes the error metric between the measured diffracted metrology signal and the calculated diffracted metrology signal. The detailed procedure for creating calculated signals for a profile library for a range of structure profile critical dimensions and resolutions and selecting the best matching library instance from the calculated signals library is contained in co-pending U.S. patent application Ser. No. 09/727,530 entitled "System and Method for Real-Time Library Generation of Grating Profiles" by Jakatdar, et al., filed on Nov. 28, 2000, which issued as U.S. Pat. No. 6,768,983 on Jan. 27, 2004, and is incorporated herein in its entirety by reference.

Still referring to FIG. 5A, the profile data of the best matching profile library instance are transmitted to the device simulator 113. Profile data comprises critical dimensions, profile shape description, and profile graphic representation. Critical dimensions are typically expressed as measurement dimensions, for example, width of 50 nanometers. Alternatively, critical dimensions are also expressed as a percent of another critical dimension, for example, 80% height of top rounding meaning the structure top starts rounding at 80% of the structure's height. An example of profile shape description is trapezoidal with top rounding profile. An example of profile graphic representation is a bit map of the profile. The device simulator 113 may be any type of device simulator simulating electrical, thermal, noise, 3D effects, steady or transient state signal, leakage and/or optical characteristics. Examples of device simulators are Raphael.™, Medici.™, ATLAS.™, and TMA-Visual.™ from companies such as Avant!, Technology Modeling Associates, and Silvaco International. The profile critical dimensions of the best matching library instance from the calculated signals library is extracted by the profiler application server 109 and transmitted to the device simulator 113. The device simulator 113 creates as output the set of process control parameters used in the simulation run and the resulting device attributes. For example, if the device simulator is an interconnect simulator, the input may be the top and bottom CD's in nanometers, and the sidewall angle in degrees in a format required by the interconnect simulator used. The output of the device simulator 113 is device attributes including resistance in ohms, capacitance in farads, and inductance in henrys. The simulation data store generator 111 creates a data store instance comprising signals, profile data, simulation type, and device attributes associated with the specific device simulation. Simulation type is the characterization of the simulation being performed, for example device simulation. A partial list of simulation types is included in FIG. 10.

Figure 5B:
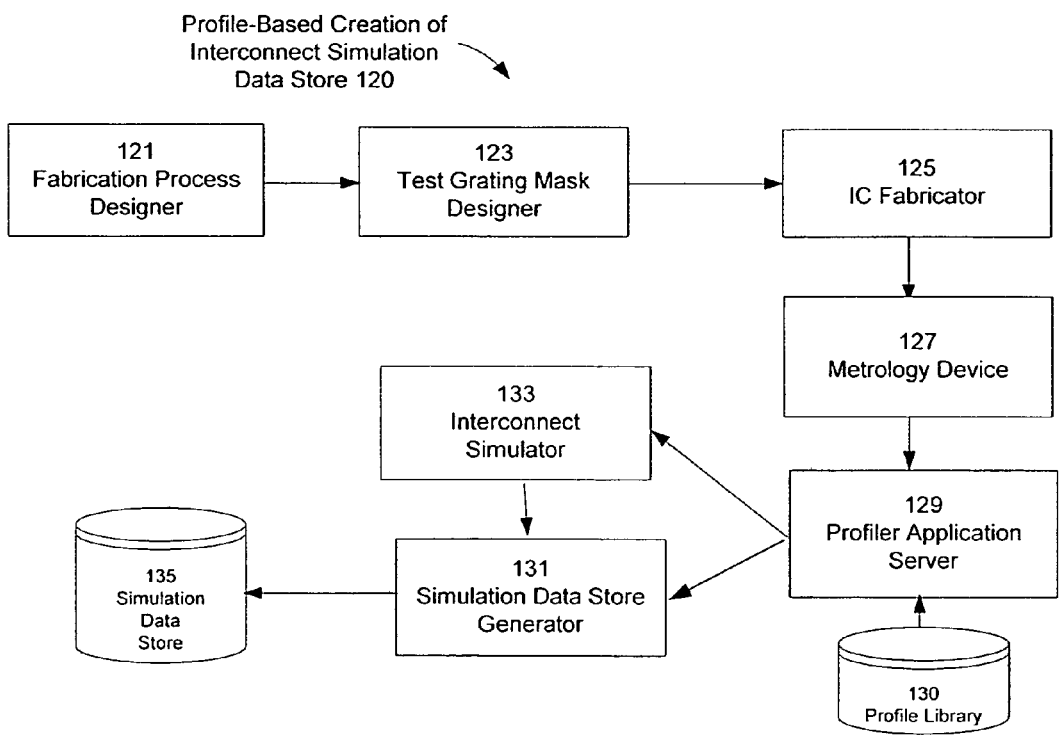
FIG. 5B is an architectural diagram illustrating the creation of an interconnect simulation data store in one embodiment of the present invention.

FIG. 5B is an architectural diagram illustrating the creation of an interconnect simulation data store in one embodiment of the present invention. The profile-based creation of a simulation data store 120 includes a fabrication process designer 121 where the series of IC interconnects are laid out. A set of test grating masks is designed in the test grating mask designer 123 that captures the various interconnect geometric information. Interconnect geometric information include profiles of structures in the wafer. The IC fabricator 125 uses the set of test grating masks to make test structures that are measured by a metrology device 127. The metrology device 127, which may be a reflectometer, an ellipsometer or other non-optical metrology device, measures the diffracted signals off the test structures and transmits the measured signals to the profiler application server 129. The profiler application server 129 compares the measured signals off the test structures to the calculated signals in a library 130 covering a range of expected structures profile critical dimensions and resolutions. The profiler application server 129 selects the best matching library instance from the library. The profile CD's of the best matching library instance is extracted by the profiler application server 129 and transmitted to the interconnect simulator 133. The interconnect simulator 133 creates as output the set of process control parameters used in the simulation run and the device attributes. Examples of interconnect simulators include Raphael.™, QuickCap.™, and Atlas.™. The output of the interconnect simulator 133 includes device attributes such as resistance in ohms, capacitance in farads, and inductance in henrys. The simulation data store generator 131 creates a data store instance in the simulation data store 135 for each test grating comprising signals, profile data, simulation type, and device attributes. Simulation type in this case is interconnect device simulation and the device attributes are those associated with the interconnect device simulation. An illustrative layout of simulation data store is depicted in FIG. 10.

Figure 6A:
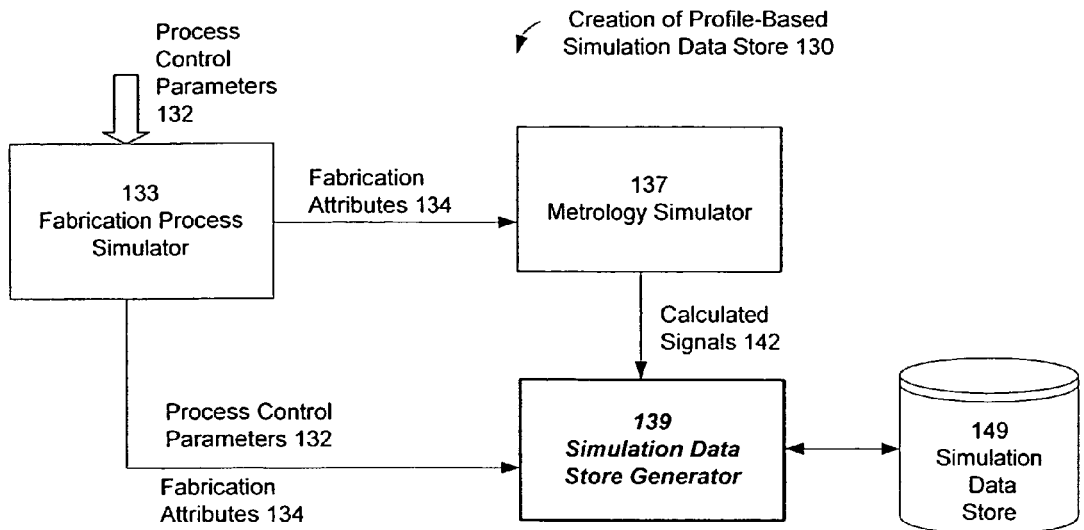
FIG. 6A is an architectural diagram illustrating the creation of a profile-based simulation data store using a fabrication process simulator in one embodiment of the present invention.
Figure 6B:
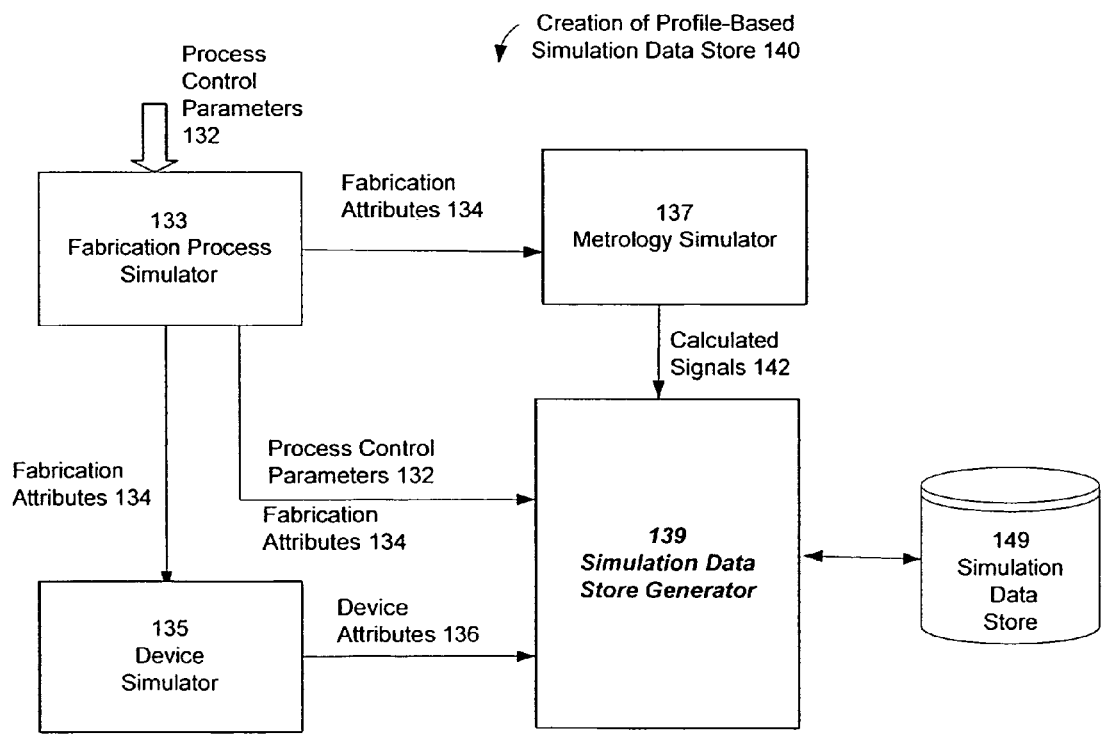
FIG. 6B is an architectural diagram illustrating the creation of a profile-based simulation data store using fabrication and device simulators in one embodiment of the present invention.
Figure 6C:
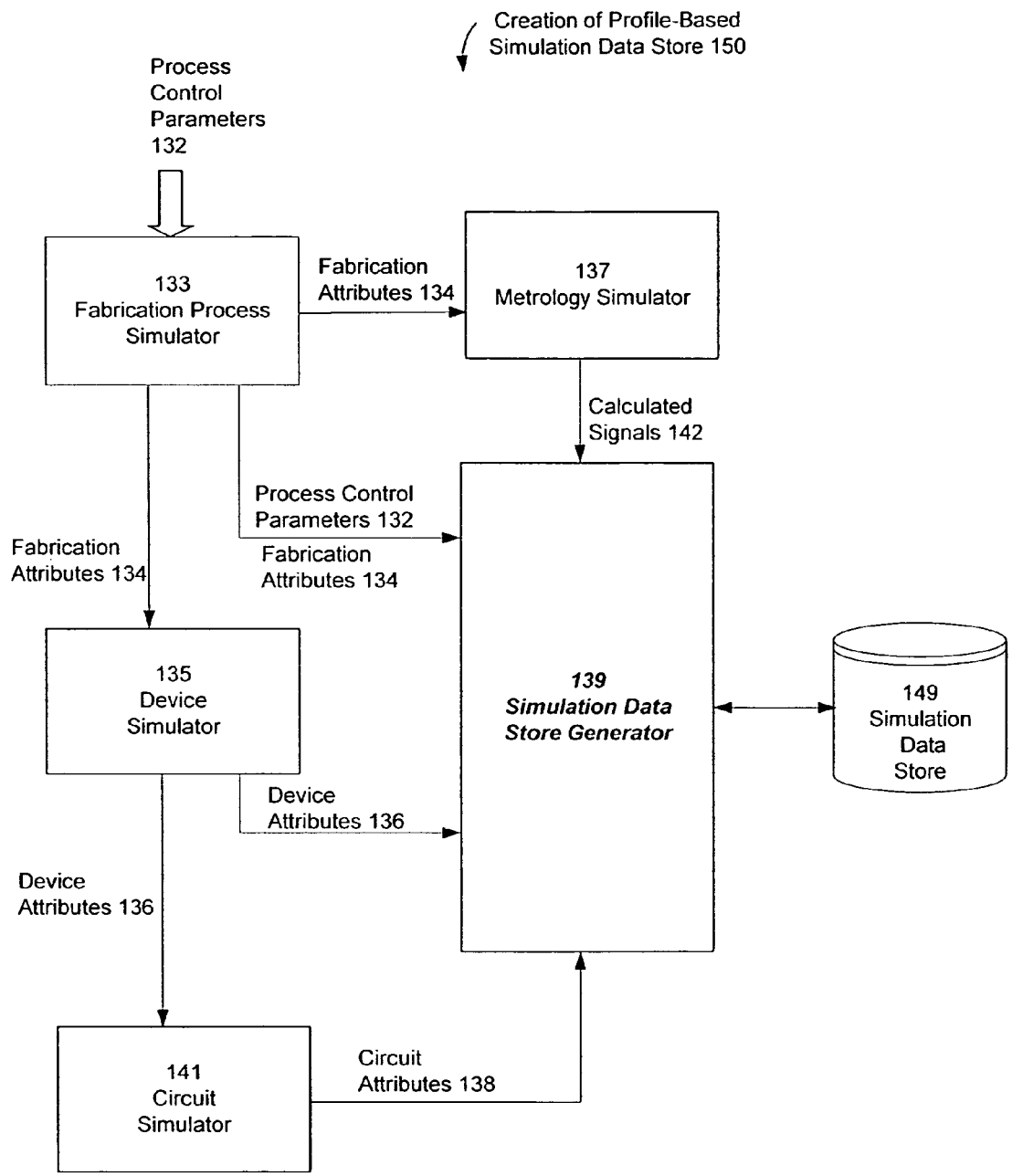
FIG. 6C is an architectural diagram illustrating the creation of a profile-based simulation data store using process fabrication, device, and circuit simulators in one embodiment of the present invention.

For FIG. 6A to 6C, similar figure objects are identified with the same numbers in order to facilitate the description of the embodiments. FIG. 6A is an architectural diagram illustrating the creation of a profile-based simulation data store using a fabrication process simulator in one embodiment of the present invention. The profile-based creation of a simulation data store 130 starts with the input of process control parameters 132 into the fabrication process simulator 133. Examples of process control parameters include exposure time, numerical aperture, and PEB temperature in a lithographic process simulation. The fabrication process simulator 133 may be any type of process simulator simulating a thin film, lithography, implantation, diffusion, oxidation, deposition, etching, CMP process or combination of processes. Using the process control parameters 132, the fabrication process simulator 133 creates the fabrication attributes 134 including the geometries of the layer structures. The process control parameters 132 and fabrication attributes 134 are transmitted to the simulation data store generator 139. The fabrication attributes 134 are transmitted to the metrology simulator 137. Fabrication attributes that pertain to the profiles of the structures are used by the metrology simulator 137 to generate diffracted signals corresponding to the profile of the structure generated by the fabrication process simulator 133. For example, the fabrication process simulator 133 may be a lithography, etch, or a combined lithography and etch simulator. The process control parameters 132 may include film thickness, bake time, exposure, PEB time, PEB temperature, rinse time, and/or etch flow rate and type of etchant. Fabrication attributes 134 may include the patterned structure profile shape and critical dimensions (CD's) such as top CD, bottom CD, height, and/or sidewall angle.

Still referring to FIG. 6A, from the fabrication attributes 134, the metrology simulator 137 extracts the profile data and calculates signals corresponding to the signals off a grating with the transmitted profile shape and CD's. In a case where the metrology simulator 137 is an optical metrology simulator, the signals are simulated diffraction signals. For a description of the calculation of simulated diffraction signals, refer to U.S. patent application Ser. No. 09/764,780 entitled "Caching of Intra-Layer Calculations for Rapid Rigorous Coupled-Wave Analyses" by Jakatdar, et al., filed on Jan. 26, 2000, which has been expressly abandoned, which is incorporated in its entirety herein by reference. The simulation data store generator 139 processes the process control parameters 132 and input data from the fabrication process simulator 133 and the metrology simulator 137 to create the simulation data store 149 instances. The simulation data store instance comprises signals, profile data, simulation type, process control parameters, and fabrication attributes associated with the process simulation. Simulation type is the characterization of the simulation being performed, for this example, fabrication process simulation. A partial list of simulation types is included in FIG. 10.

FIG. 6B is an architectural diagram illustrating the creation of a profile-based simulation data store using fabrication and device simulators in one embodiment of the present invention. The profile-based system for creating the simulation data store 140 using a process simulator and a device simulator is similar to the process described for FIG. 6A except that the output from the fabrication process simulator 133 including fabrication attributes is also transmitted to a device simulator 135. The device simulator 135 utilizes the fabrication attributes to perform a device simulation and transmits device attributes 136 to the simulation data store generator 139. The simulation data store generator 139 processes the input data from the fabrication process simulator 133 comprising process control parameters 132 and fabrication attributes 134, data from the metrology simulator 137 comprising calculated diffracted signal 142, and data from the device simulator 135 comprising device attributes 136 to create the simulation data store 149. The simulation data store 149 instances comprises signals, profile data, simulation type, process control parameters, fabrication attributes, and device attributes. Simulation type in this case is a combined fabrication-process-and-device simulation. For example, the fabrication process simulator may be a combined lithography-and-etch process simulator whereas the device simulator may be an interconnect simulator. Other devices that may be simulated include diodes, transistors, optical devices, power devices, or photo detectors. An illustrative layout of simulation data store is depicted in FIG. 10. The simulation data store for this example would be able to provide responses to several types of queries with a given data. If the given data is the desired capacitance of a device, the simulation data store can provide the required profile(s) of the interconnects. Similarly, if the given data is a profile of the interconnect, the simulation data store can provide the corresponding process control parameters such as numerical aperture, bake time, PEB temperature, etch time or type of etchant. Many other variations of the given data discussed later can be formulated to give the desired query response.

Still referring to FIG. 6B, the fabrication process simulator 133 and the device simulator 135 may be separate objects or combined in a single object or a single software package. Examples of combined process and device simulators include Victory.™ from Silvaco International and Microtec.™ from Syborg Systems, Inc.

FIG. 6C is an architectural diagram illustrating the creation of a profile-based simulation data store using fabrication process, device, and circuit simulators in one embodiment of the present invention. The profile-based system for creating the simulation data store 150 using a fabrication process simulator, a device simulator, and a circuit simulator is similar to the process described for FIG. 6B except that the output from the device simulator 135 including device attributes 136 are also transmitted to a circuit simulator 141. The circuit simulator 141 utilizes the device attributes of several devices that form the circuit. For example, a transmission line includes several interconnect devices to form a circuit. Examples of circuits that may be simulated include transmission lines, resistors, capacitors, inductors, amplifiers, switches, diodes, or transistors. The combination of selected devices to form a circuit are simulated, the simulations creating device attributes 136 that are used to perform a circuit simulation with the circuit simulator 141. The circuit simulator 141 generates and transmits circuit attributes 138 to the simulation data store generator 139. The simulation data store generator 139 processes the input data from the fabrication process simulator 133 comprising process control parameters 132 and fabrication attributes 134, data from the metrology simulator 137 comprising calculated diffracted signal 142, and data from the device simulator 135 comprising device attributes 136, and data from the circuit simulator 141 comprising circuit attributes 138 to create the simulation data store 149. The simulation data store 149 instance comprises signals, profile data, simulation type, process control parameters, fabrication attributes, device attributes, and circuit attributes. Simulation type is the characterization of the simulation being performed, for this example, combined fabrication process, device, and circuit simulation. A partial list of simulation types is included in FIG. 10.

Still referring to FIG. 6C, the fabrication process simulator 133, device simulator 135, and circuit simulator 141 may be separate objects or combined in a single object or a single software package. Examples of circuit simulators include SPICE.™, various adaptations of SPICE.™, SPECTRE.™, APLAC.™, and PROTOLAB.™. An example of a combined total process simulator is ATHENA.™ from Silvaco International.

The concepts and principles of the present invention will apply to other combination simulators such as a combined device-and-circuit simulation. Creation of the simulation data store would be done in a similar manner. Similarly, the device simulator and circuit simulator may be separate objects or combined in a single object or a single software package. Examples of combined device-and-circuit simulators include MEDICI.™, TOPSPICE.™, CIDER.™, and SIMPLORER.™.

Figure 7A:
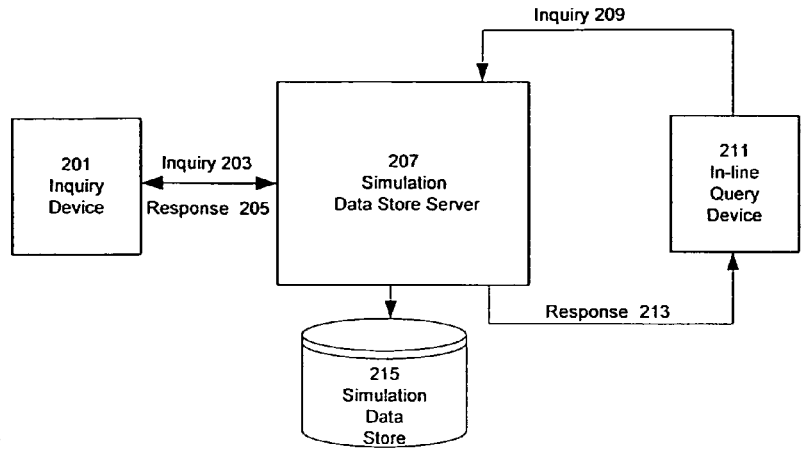
FIG. 7A is an architectural diagram illustrating inquiry and in-line use of a simulation data store in one embodiment of the present invention.

FIG. 7A is an architectural diagram illustrating inquiry and in-line use of a simulation data store in one embodiment of the present invention. An inquiry 203 from an inquiry device 201 is transmitted to a simulation data store server 207 that analyzes the inquiry and accesses the instance(s) of the simulation data store 215 and formulates the response 205. The simulation data store server 207 may also be invoked by an in-line query 209 generating a response 213. In one application, the inquiry 209 is from an in-line query device 211 generating a response 213. The inquiry 209 comprises the type of inquiry and query given data. Depending on the type of inquiry and query given data, the simulation data store server 207 retrieves the appropriate instance(s) of the simulation data store 215 and formats and transmits the response 213. The in-line query device 211 may be part of a computer system or part of an IC fabrication system. The inquiry device 201 may be a stand-alone device or part of a system. Furthermore, the inquiry device 201 may be local or accessible through a network.

Figure 7B:
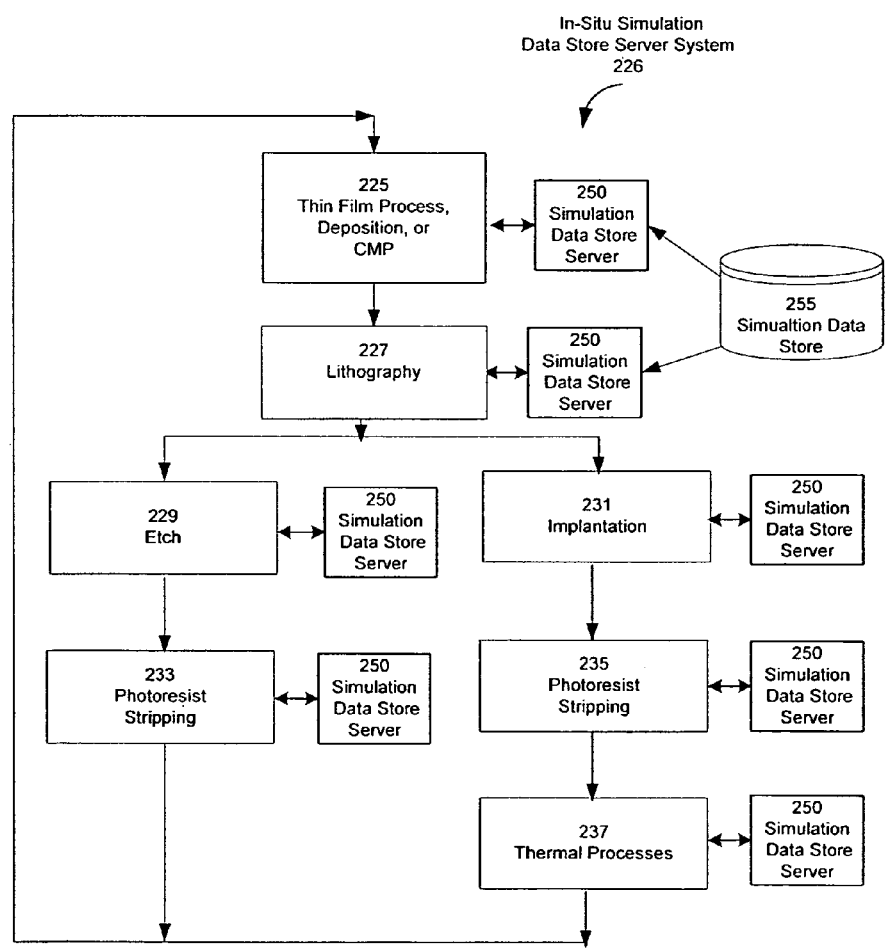
FIG. 7B is an architectural diagram illustrating in-situ use of a simulation data store in various fabrication steps in one embodiment of the present invention.

FIG. 7B is an architectural diagram illustrating the in-situ use of a simulation data store in various fabrication steps in one embodiment of the present invention. A simulation data store server 250 coupled to a simulation data store 255 may be part of a fabrication system, the simulation data store server 250 providing immediate in-situ profile-based simulation information. The simulation data store server 250 may be coupled to a thin film, deposition or CMP 225, lithography 227, etch 229, PR stripping after etch 233, PR stripping after implantation 235, implantation 231, and/or thermal processes 237 devices. The simulation data store server 250 may be locally or remotely connected to the fabrication devices. The simulation data store server 250 may be several separate servers or one centralized server. Test structures or test gratings in a wafer may be measured by an integrated metrology device (not shown) during or after a fabrication step. The metrology measurement generates measured signals that may be used as the query given data to the simulation data store server 250. The simulation data store server 250 generates an in-situ/in-line response based on the inquiry type and query given data. For example, during or after a photoresist stripping step, if the inquiry type from the fabrication device is for electrical properties of the IC structure modeled by the test grating and the query given data is the diffracted signal off the test grating, the simulation data store server 250 would formulate a response comprising conductance, capacitance, and/or resistance of the IC structure modeled by the test grating. In another example after a lithography step, if the inquiry type is for process control parameters associated with the measured signals off the test grating, the simulation data store server 250 would formulate a response comprising bake time, bake temperature, focus, and PEB time and temperature. As will be discussed below, many other combinations of inquiry type and query given data can be transmitted to the data store server 250 to get the specific response required.

Figure 8A:
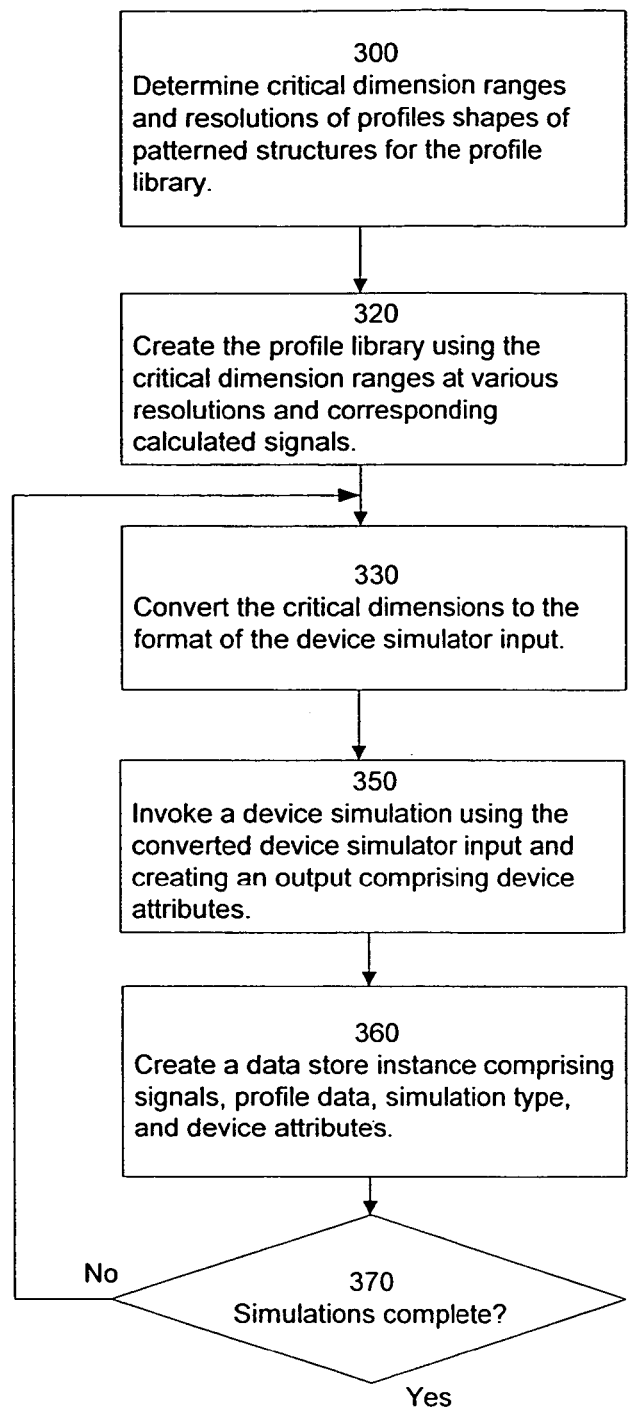
FIG. 8A is a flow chart of the operational steps for creation of a profile-based simulation data store using profile library data in one embodiment of the present invention.
Figure 9A:
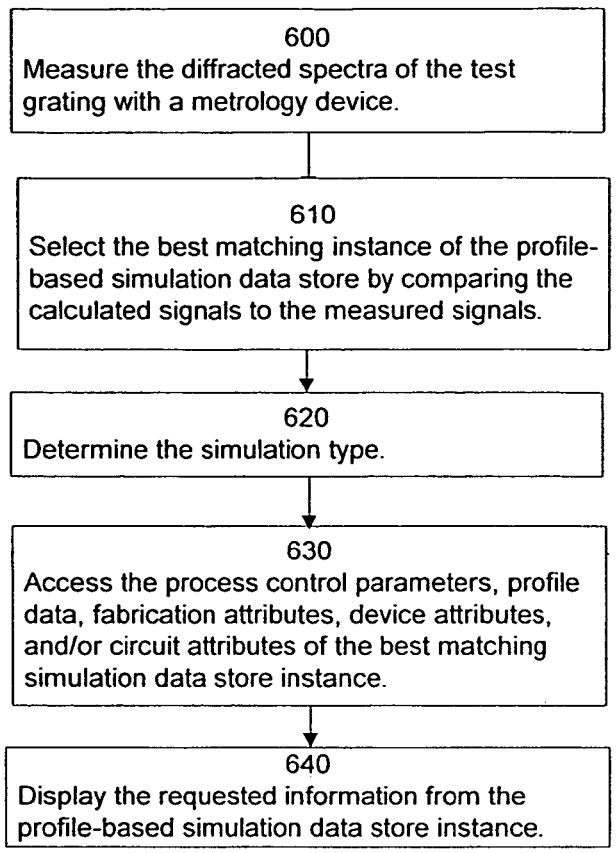
FIG. 9A is a flow chart of operational steps for in-situ utilization of a profile-based simulation data store in one embodiment of the present invention.
Figure 9B:
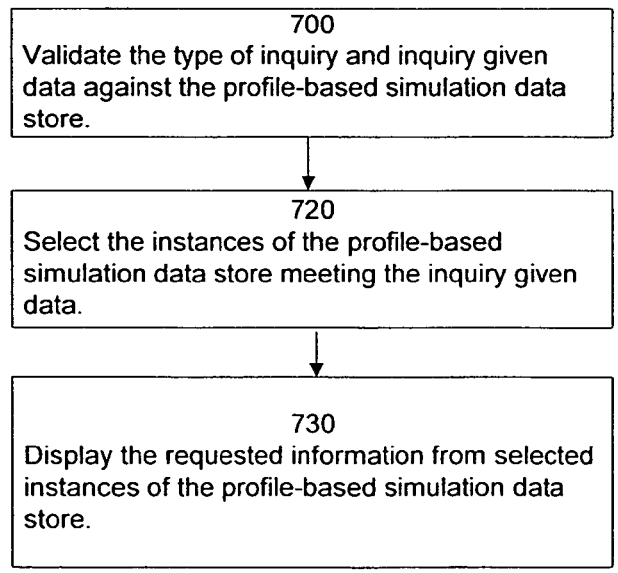
FIG. 9B is a flow chart of operational steps for online inquiry utilization of a profile-based simulation data store in one embodiment of the present invention.

FIG. 8A is a flow chart of the operational steps for creation of a profile-based simulation data store using profile library data in one embodiment of the present invention. The expected profile data ranges and resolutions of profile shapes of patterned structures for the profile library are determined 300. For example, a trapezoidal profile shape may be characterized by the top CD, bottom CD, grating thickness, height and width at the inflection point, and underlying thickness in nanometers. The profile data ranges would include a minimum, maximum, and resolution for the top CD, bottom CD, grating thickness, height and so on. The profile data ranges at various resolutions of profile shapes are used to calculate the simulated diffracted signals and to create the profile library 320. The detailed procedure for creating a profile library for a range of structure profile critical dimensions and resolutions is contained in U.S. patent application Ser. No. 09/727,530 entitled "System and Method for Real-Time Library Generation of Grating Profiles" by Jakatdar, et al., filed on Nov. 28, 2000, which issued as U.S. Pat. No. 6,768,983 on Jan. 27, 2004, which is incorporated herein in its entirety by reference.

The profile data ranges for the expected profile shapes are converted into the device simulator input 330. For example, if the device simulator is an interconnect simulator, the expected profile shape dimensions are converted into the format required by the selected interconnect simulator, like Raphael.™. Using the converted device simulator input, the device simulator is invoked 350 generating the device attributes. Continuing with the interconnect simulator example, the interconnect simulator is invoked using the converted profile data as the interconnect simulator input, generating device attributes comprising electric and thermal properties such as resistance, capacitance, inductance, potential, temperature, and current density distribution. A simulation data store instance is created comprising diffracted signals, profile data, simulation type, and device attributes 360. Again continuing with the interconnect example and assuming an optical metrology device, the simulation data store instance created includes signals such as tangent ($\Psi$) and cosine ($\Delta$) data for a wavelength range for an ellipsometer or reflected light intensity for a wavelength range for a reflectometer, the wavelength range and measurement points dependent on the manufacturer of the optical metrology device. In addition, the simulation data store instance created also includes the associated profile data comprising profile shape CD's, simulation type being interconnect device simulation, profile data comprising top CD, bottom CD, grating thickness, height and width at inflection point, and underlying thickness; and device attributes such as resistance, capacitance, inductance, potential, temperature, and current density distribution. The simulation data store creation process is iterated until the simulations are complete 370.

Figure 8B:
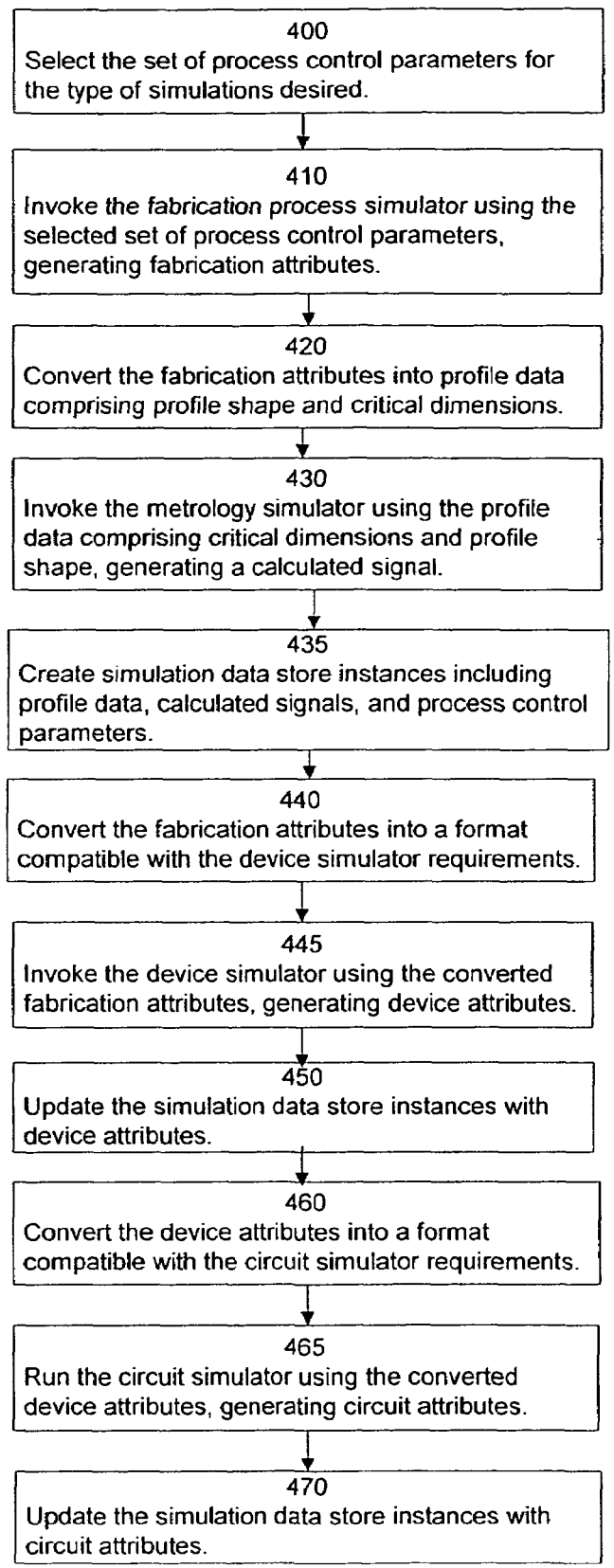
FIG. 8B is a flow chart of the operational steps for creation of a profile-based simulation data store using test gratings in one embodiment of the present invention.

FIG. 8B is a flow chart of the operational steps for creation of a profile-based simulation data store using test gratings in one embodiment of the present invention. The set of process control parameters for the type of simulations desired is selected 400. Using the selected set of process control parameters, the fabrication process simulator is invoked 410, generating fabrication attributes. The fabrication attributes are converted into profile data comprising profile shape and critical dimensions 420. A metrology simulator uses the profile shape and critical dimensions to calculate diffracted signals 430. Data including the process control parameters, the profile data, the calculated signals are used to create a simulation data store instance 435. For example, if the type of fabrication process simulation is lithography, the set of process control parameters may include values of the bake time, bake temperature, focus, PEB time, and/or rinse temperature. The fabrication attributes generated by the fabrication process simulation include profile data, comprising profile shape and geometry of the structure. The profile shape and geometry is converted into the CD's required by the metrology simulator to calculate the reflected signals. If the profile shape is trapezoidal profile with top rounding and bottom footing, the CD's include the feature footing bottom width, trapezoidal bottom width, total height, trapezoidal width, and the rounding top width.

Fabrication attributes generated by the fabrication process simulator are converted to the format compatible with the device simulator requirements 440. The device simulator is invoked using the converted fabrication attributes, generating device attributes 445. The simulation data store instances are updated with the device attributes 450. In one embodiment, the fabrication process simulator and the device simulator are combined in a single package, removing the requirement of conversion of input parameters into compatible formats. Several devices that form a circuit or part of a circuit may be grouped together for a circuit simulation. For example, several IC components such as gates, contact holes, vias, and pads forming a circuit or part of a circuit are grouped together for a circuit simulation. Device attributes for each of these grouped devices are converted into a format compatible with the circuit simulator requirements 460. The circuit simulator is invoked, using the converted device attributes, generating circuit attributes 465. Examples of circuit attributes are voltage and current as function of time, noise analysis, distortion analysis, and sensitivity analysis. The appropriate simulation data store instances are updated with the corresponding circuit attributes 470.

FIG. 9A is a flow chart of operational steps for in-situ utilization of a profile-based simulation data store in one embodiment of the present invention. The signals off the test gratings of a wafer are measured with a metrology device 600. A best matching signal instance in the profile-based simulation data store is selected 610. The simulation type is determined 620 in order to access the simulation data associated with the best matching simulation data store instance 630. The requested information from the profile-based simulation data store is displayed 640. Process control parameters, signals, profile data, fabrication attributes, device attributes, and/or circuit attributes may be displayed.

For example, test gratings in a wafer after a lithography and etch process are measured with an optical metrology device, generating measured diffracted spectra. The best matching instances of the simulation data store compared to the diffracted spectra of the test gratings are selected and profile data of the test gratings are extracted. The requested information comprises electrical device attributes associated with an interconnect device simulation. Capacitance, resistance, and inductance information from the simulation data store corresponding to the profile data of the test gratings are displayed.

FIG. 9B is a flow chart of operational steps for online inquiry utilization of a profile-based simulation data store in one embodiment of the present invention. The type of inquiry and query given data is validated against the profile-based simulation data store 700. Instances of the profile-based simulation data store meeting the inquiry type and query given data are selected 720. The requested information from the selected instances of the profile-based simulation data store is displayed 730. For example, if the inquiry type is for process control parameters of a lithography simulation and the query given data is electrical conductivity, displayed information may include profile CD's and data on the focus, exposure, PEB temperature, resist thickness, and anti-reflective coating thickness for the lithography process. Conversely, if the inquiry type is for device attributes and the query given data are diffracted signals, displayed information may include capacitance and other device attributes. Alternatively, if the inquiry is for profile data of a via and the query given data consists of voltage and current as a function of time for a circuit, the displayed data may include the profile shape and CD's of the profile. It is understood that a person knowledgeable in the art can formulate a number of different inquiry types and various combinations of query given data to get the right information displayed from the profile-based simulation data store.

FIG. 10 illustrates a simulation data store format of a profile-based simulation data store in one embodiment of the present invention. Data store format 800 includes signals 801, profile data 803, simulation data segments 804 comprising simulation type 805, process control parameters or input parameters 807, and fabrication, device, and/or circuit attributes 809. For a given signal 801 and corresponding profile data 803, there may be several simulation data segments 804 of simulation type 805, process control parameters or input parameters 807, and fabrication, device, and/or circuit attributes 809. Simulation type 805 includes fabrication process simulation, device simulation, circuit simulation, combined fabrication and device simulation, combined device and circuit simulation, or combined fabrication, device, and circuit simulation. Examples of fabrication process simulation include lithography, etch, implantation, oxidation, CMP, diffusion, deposition and etching, deposition and reflow, 2-dimensional process, 3-dimensional process simulations, plus various combinations of the foregoing processes. Examples of device simulation include interconnect, electrostatic discharge, optical device, power device, compound device, and other device simulations. Examples of circuit simulation include transient signal, signal integrity, noise, and other circuit simulation.

FIG. 10 illustrate examples of simulation data store format for an interconnect device simulation and a combined fabrication process and device simulation. In Example 1, an interconnect device simulation, the signal is expressed in values representing optical metrology measurement data using an ellipsometer. This example has one simulation data segment where the key input parameter is profile data and the device attributes are capacitance, inductance, and resistance. Example 2 represents a simulation data store instance storing data from two linked simulations, namely, a lithography and etch fabrication process simulation linked to an interconnect device simulation. Each simulation has a corresponding simulation data segment. The fabrication process simulation generated the fabrication attributes that are used as input to the device simulation. It is understood that to one knowledgeable in the art, the various combinations of fabrication process, device, and circuit simulations would result in corresponding combinations of simulation data segments following the same concepts and principles illustrated in the foregoing examples.

FIG. 11A is a graph showing the correlation of optical metrology CD and the difference $\Delta W$ of the electric CD from the mask CD. The $CD_{OPTICAL\ METROLOGY}$ is the critical dimension of a structure as determined by an optical metrology device such as an ellipsometer or a reflectometer. $CD_{MASK}$ is the critical dimension designed in a mask, such as top CD of a structure. $CD_{ELECTRIC}$ is the critical dimension of the structure based on the electrical properties and is derived starting with the basic equation: V/I=R where V is the voltage, I is the current, and R is the resistance. The resistance R is equal to resistivity $\rho$ divided by the area A:

$$R=\rho/A=\rho/H*CD_{ELECTRIC}$$

where H is the height of the structure and $CD_{ELECTRIC}$ is the effective width. Given that the resistivity $\rho$ of a structure material and H are generally constant, $CD_{ELECTRIC}$ is the variable that controls the electrical resistance of the structure. The graph 811 in FIG. 11A shows close correlation of optical metrology CD to $\Delta W$, the difference between the electric CD from the mask CD, the weighted average graph being a straight line. This empirical data illustrates the utility of profile-based simulation data stores as described in the various embodiments.

FIG. 11B are two graphs showing less variation of bottom CD and feature sidewall angle for a full-profile monitored fabrication process compared to CD-only monitored or no profile monitoring of the fabrication process. Empirical data obtained using an exponentially weighted moving average controller and first order integrated moving average disturbance generator indicate that full-profile control 821 of the bottom CD in a lithographic simulation provided the least variations of bottom CD compared to CD-only control 825 or no control 823 shown in the top graph. Similarly, the bottom graph based on empirical data indicate that full-profile control 835 of the sidewall angle in a lithographic simulation provided the least variations of sidewall angle compared to CD-only control 833 or no control 831. Similar to FIG. 11A, these graphs that are based on empirical data illustrate the utility of profile-based simulation data stores as described in the various embodiments.

There are many uses for a profile-based simulation data store in IC manufacturing. The concepts and principles of the present invention are applicable to simulations of IC fabrication process steps, devices, or circuits. As will be apparent to a person knowledgeable in the art, the concepts and principles of creating and using a profile-based simulation data store also applies to combinations of fabrication process and device simulations, device and circuit simulations, or fabrication process, device, and circuit simulations.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks.

Other variations and embodiments are possible in light of above teachings, and it is thus intended that the scope of invention not be limited by this Detailed Description, but rather by Claims following.

We claim:

1. A method of examination an integrated circuit (IC) structure formed on a semiconductor wafer, the method comprising:
    obtaining a measured diffraction signal of the IC structure, the measured diffraction signal having been measured using an optical metrology device;
    calculating diffraction signals using a metrology simulator;
    storing the calculated diffraction signals and corresponding device attributes in a simulation data store embodied in a computer-readable storage medium, the device attributes including electrical and/or thermal properties of devices to be formed on the semiconductor wafer;
    comparing the measured diffraction signal to the calculated diffraction signals stored in the simulation data store;
    obtaining a best matching calculated diffraction signal from the simulation data store based on the comparison of the measured diffraction signal and the calculated diffraction signals stored in the simulation data store;
    retrieving from the simulation data store the device attributes corresponding to the best matching calculated diffraction signal for examination the IC structure; and
    outputting the retrieved device attributes.

2. The method of claim 1, wherein the device attributes include resistance, capacitance, and/or inductance.

3. The method of claim 1, wherein the simulation data store has profile data corresponding to the calculated diffraction signals, and further comprising:
    retrieving from the simulation data store the profile data corresponding to the best matching calculated diffraction signal; and
    outputting the profile data.

4. The method of claim 3, wherein the profile data includes critical dimensions.

5. The method of claim 4, wherein the profile data includes profile shape description and profile graphic representation.

6. The method of claim 1, wherein the simulation data store has process control parameters corresponding to the calculated diffraction signals, and further comprising:
    retrieving from the simulation data store the process control parameters corresponding to the best matching calculated diffraction signal; and
    outputting the process control parameters.

7. The method of claim 6, wherein the process control parameters include numerical aperture, bake time, post exposure bake temperature, etch time, and/or type of etchant.

8. The method of claim 1, wherein the optical metrology device is a reflectometer or an ellipsometer.

9. The method of claim 1, wherein the devices are transmission lines, resistors, capacitors, inductors, amplifiers, switches, diodes, and/or transistors.

10. The method of claim 1, wherein each calculated diffraction signal in the simulation data store is different, and each calculated diffraction signal is associated with one set of device attributes of one device.

11. A computer-readable medium having computer executable instructions for examining, an integrated circuit (IC) structure formed on a semiconductor wafer, comprising instructions for:
   obtaining a measured diffraction signal of the IC structure, the measured diffraction signal having been measured using an optical metrology device;
   calculating diffraction signals using a metrology simulator;
   storing the calculated diffraction signals and corresponding device attributes in a simulation data store embodied in a computer-readable storage medium, the device attributes including electrical and/or thermal properties of devices to be formed on the semiconductor wafer;
   comparing the measured diffraction signal to the calculated diffraction signals stored in the simulation data store;
   obtaining a best matching calculated diffraction signal from the simulation data store based on the comparison of the measured diffraction signal and the calculated diffraction signals stored in the simulation data store;
   retrieving from the simulation data store the device attributes corresponding to the best matching calculated diffraction signal for examining the IC structure; and
   outputting the retrieved device attributes.

12. The computer-readable medium of claim 11, wherein the simulation data store has profile data corresponding to the calculated diffraction signals, and further comprising instructions for:
   retrieving from the simulation data store the profile data corresponding to the best matching calculated diffraction signal; and
   outputting the profile data.

13. The computer-readable medium of claim 11, wherein the simulation data store has process control parameters corresponding to the calculated diffraction signals, and further comprising instructions for:
   retrieving from the simulation data store the process control parameters corresponding to the best matching calculated diffraction signal; and
   outputting the process control parameters.

14. A system to examine an integrated circuit (IC) structure formed on a semiconductor wafer, the system comprising:
   an optical metrology device configured to measure a measured diffraction signal of the IC structure;
   a metrology simulator configured to calculate diffraction signals;
   a simulation data store embodied in a computer-readable storage medium, the simulation data store having the calculated diffraction signals and corresponding device attributes, the device attributes including electrical and/or thermal properties of devices to be formed on the semiconductor wafer; and
   a processor configured to:
      compare the measured diffraction signal to the calculated diffraction signals stored in the simulation data store;
      obtain a best matching calculated diffraction signal from the simulation data store based on the comparison of the measured diffraction signal and the calculated diffraction signals stored in the simulation data store;
      retrieve from the simulation data store the device attributes corresponding to the best matching calculated diffraction signal to examine the IC structure; and
      output the retrieved device attributes.

15. The system of claim 14, wherein the device attributes include resistance, capacitance, and/or inductance.

16. The system of claim 14, wherein the simulation data store has profile data corresponding to the calculated diffraction signals, and wherein the profile data includes critical dimensions, profile shape description, and/or profile graphic representation.

17. The system of claim 14, wherein the simulation data store has process control parameters corresponding to the calculated diffraction signals, and wherein the process control parameters include numerical aperture, bake time, post exposure bake temperature, etch time, and/or type of etchant.

18. The system of claim 14, wherein the optical metrology device is a reflectometer or an ellipsometer.

19. The system of claim 14, wherein the devices are transmission lines, resistors, capacitors, inductors, amplifiers, switches, diodes, and/or transistors.

20. The system of claim 14, wherein each calculated diffraction signal in the simulation data store is different, and each calculated diffraction signal is associated with one set of device attributes of one device.

* * * * *